(12) United States Patent
Koehler et al.

(10) Patent No.: US 8,042,092 B2
(45) Date of Patent: Oct. 18, 2011

(54) METHOD FOR GENERATING AN EXECUTABLE WORKFLOW CODE FROM AN UNSTRUCTURED CYCLIC PROCESS MODEL

(75) Inventors: Jana Koehler, Oberrieden (CH); Rainer F. Hauser, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 12/053,664

(22) Filed: Mar. 24, 2008

(65) Prior Publication Data

US 2008/0178146 A1 Jul. 24, 2008

Related U.S. Application Data

(63) Continuation of application No. 11/056,784, filed on Feb. 11, 2005, now abandoned.

(30) Foreign Application Priority Data

Mar. 18, 2004 (EP) .................................... 04405162

(51) Int. Cl.
*G06F 9/44* (2006.01)
(52) U.S. Cl. .................... 717/106; 717/105; 717/109
(58) Field of Classification Search .................... None
See application file for complete search history.

(56) References Cited

U.S. PATENT DOCUMENTS

| | | | |
|---|---|---|---|
| 6,038,538 A | 3/2000 | Agrawal et al. | |
| 6,308,224 B1 | 10/2001 | Leymann et al. | |
| 7,272,820 B2 * | 9/2007 | Klianev | 717/109 |
| 7,296,056 B2 * | 11/2007 | Yaung | 709/205 |
| 7,350,188 B2 * | 3/2008 | Schulz | 717/104 |
| 2003/0208743 A1 | 11/2003 | Chong et al. | |

FOREIGN PATENT DOCUMENTS

| EP | 1197849 A2 | 4/2002 |
|---|---|---|
| WO | 97/08634 A1 | 3/1997 |

OTHER PUBLICATIONS

Van Der Aalst W M P et al., "Workflow Patterns", Distributed and Parallel Databases, Kluwer Academic Publishers, BO, vol. 14, No. 1, Jul. 1, 2003, pp. 5-51, XP019205678, ISSN: 1573-7578.
Cardoso J et al, "Semantic E-workflow Composition", Journal of Intelligent Information Systems: Artificialintelligence and Database Technologies, Kluwer Academic Publishers, Amsterdam, NL, vol. 21, No. 3, Nov. 1, 2003, pp. 191-225, XP002323580, ISSN: 0925-9902.

* cited by examiner

*Primary Examiner* — Lewis Bullock, Jr.
*Assistant Examiner* — Michael Yaary
(74) *Attorney, Agent, or Firm* — Gibb I.P. Law Firm, LLC

(57) ABSTRACT

A method for generating an executable workflow code from an unstructured cyclic process model. The method comprises the following steps. First a continuation equation system is generated from the unstructured cyclic process model. Then, the executable workflow code is generated from the continuation equation system, wherein therefore, the continuation equation system is solved by means of transformation rules.

14 Claims, 6 Drawing Sheets while-do repeat-until

METHOD FOR GENERATING AN EXECUTABLE WORKFLOW CODE FROM AN UNSTRUCTURED CYCLIC PROCESS MODEL

CROSS-REFERENCE TO RELATED APPLICATIONS

This application is a continuation of U.S. application Ser. No. 11/056,784 filed Feb. 11, 2005, the complete disclosure of which, in its entirety, is herein incorporated by reference.

TECHNICAL FIELD

The present invention relates to a method for generating an executable workflow code from an unstructured cyclic process model and also to a computer program element for executing the method.

BACKGROUND OF THE INVENTION

Today, a graphical description of a business process can be drawn, but it can not be mapped directly to an executable implementation on a workflow engine unless the business process is heavily simplified.

There are two categories of graphical tools for modeling business processes.

Graphical tools of the first category allow a user to describe the process and the behaviors it is intended to show in a completely free manner by using the user's own graphical notation. In this case, the meaning of the symbols in the notation is known only to the user and not by the graphical tool. The user can use the graphical rendering of his notation in the tool to communicate the meaning to other users. But, the user cannot use the graphical rendering to generate code that can be executed on some workflow engine. An example therefor is Microsoft Visio (™ of Microsoft Corp.).

Graphical tools of the second category allow a user to describe the process by using a fixed set of graphical symbols provided by the tool. Before the user can describe the process, he must learn the set of symbols and understand their intended meaning, which is captured in the tool. The graphical tool may also check the user's input whether it complies with modeling rules implemented in the tool. If the user complies with these rules, an executable workflow can be generated with the help of the tool. WBI Modeler in MQ Series Workflow (™ of IBM Corporation) mode is an example therefor.

It is a particular characteristic that tools of the second category allow the user not to describe process flows, using arbitrary graphs. Very often, the flow must be acyclic, i.e. it must not contain loops, when code is to be generated. For example the WBI Modeler allows so called GO TO connectors to implicitly describe cycles, but not in MQ Series Workflow mode. This limitation restricts the freedom of the business process modeler and enforces him to create models which correspond to the abilities of the tool, but not necessarily to the complex reality. From these simplified models, only simplified workflows can be generated, which is a major inhibitor to the adoption of workflow technology today.

SUMMARY OF THE INVENTION

An object of the invention is to provide a method for generating an executable workflow code from an unstructured cyclic process model and a computer program element for executing the method wherein the process model can have a cyclic structure and wherein the workflow code is generated automatically.

A further object of the invention is to optimize the workflow code with regard to the amount of memory that is required to store it, the runtime and the communication effort required to execute it.

The method for generating an executable workflow code from an unstructured cyclic process model according to the invention comprises the following steps. First a continuation equation system is generated from the unstructured cyclic process model. Then, the executable workflow code is generated from the continuation equation system. The code is then executable by a workflow engine.

More specific, a computing device, that can be a business model computer, can be programmed for designing the unstructured cyclic process model. The unstructured cyclic process model is then transformed to a representation that represents flow continuations as captured in the process model. Transformation rules are applied to the set of flow continuations guided by a transformation engine. Thereby the unstructured process model is automatically transformed into a well-structured and optimized executable workflow code.

The representation can be an equational representation.

A computer program element comprises computer program code for performing steps according to the method for generating an executable workflow code from an unstructured cyclic process model when loaded in a digital processor of a computing device.

Advantageous further developments of the invention arise from the characteristics indicated in the dependent claims.

Preferably, for generating the continuation equation system variables are assigned to nodes of the process model.

In a further embodiment of the method according to the invention variables are assigned to the start and end nodes of the process model. Furthermore a variable is assigned to a node that has more than one incoming or outgoing link.

For generating the executable workflow code the continuation equation system can be solved by means of transformation rules.

For solving the continuation equation system at first a transformation rule is selected that is applicable to an equation of the continuation equation system. Then the selected transformation rule is applied to the equation and the modified continuation equation system is computed. Finally these steps are repeated until a single equation remains.

In an embodiment of the method according to the invention with the help of a first transformation rule a variable of a first equation is substituted by an expression of a second equation.

In a further embodiment of the method according to the invention with the help of a second transformation rule the number of occurrences of the same variable in an equation is reduced.

The second transformation rule can be implemented in the following way: at each place where the variable occurs it is replaced by a Boolean variable, and a conditional statement is introduced in the equation for branching to the variable if the Boolean variable fulfills the condition.

In a further embodiment of the method according to the invention with the help of a third transformation rule a variable occurring on both sides of an equation is replaced by a repeat-until statement.

The third transformation rule can be implemented in the following way: the condition for terminating the repeat-until statement is obtained from the negation of the condition that led in the original equation to the variable.

In a further embodiment of the method according to the invention with the help of a fourth transformation rule conditional statements in an equation are rearranged in the equation.

In a further improvement of the method according to the invention each transformation rule is assigned to a priority, and the transformation rule with the highest priority is applied first.

Advantageously, the second transformation rule of the method according to the invention is assigned to the highest priority.

Over and above this it is helpful when in the method according to the invention that variable is eliminated first which occurs most seldom in the continuation equation system.

Furthermore, in the method according to the invention the single equation can be mapped to an XML file.

In another aspect of the invention the method for generating an executable workflow code from an unstructured cyclic process model can be used for mapping a business process to an executable workflow on a workflow engine.

According to a further aspect of the invention a code generator for generating an executable workflow code from an unstructured cyclic process model is provided. The code is executable by a workflow engine. The code generator comprises a computing device for designing the unstructured cyclic process model, and a transformation engine adapted to generate a continuation equation system from the unstructured cyclic process model and adapted to generate the executable workflow code from the continuation equation system.

In accordance with another aspect of the invention it is provided a code generation method for generating an executable workflow code from a graphical flow chart comprising an unstructured cyclic process model by means of a transformation engine. The method comprises the steps of generating a continuation equation system from the unstructured cyclic process model, and generating the executable workflow from the continuation equation system.

The transformation engine comprises a rule controller for applying the transformation rules. Further, the transformation engine comprises an output that provides or outputs the executable workflow code. The graphical flow chart can be displayed on a screen which is contemplated as input for the code generation.

Additional objects and advantages of the invention will be set forth in the description which follows, and in part will be obvious from the description, or may be learned by practice of the invention.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

REFERENCE SIGNS

In order to aid the understating of the description, the following reference signs are used.

| | |
|---|---|
| x1-x8 | continuation variables |
| A-D | actions |
| E, F, G | conditions/decisions |

DETAILED DESCRIPTION OF THE DRAWINGS

The method and tool according to the invention allows a user to use completely arbitrary cycles in the graphical rendering of a process model and then map or compile these cyclic models into optimized and executable workflow code. The invention associates a continuation semantics with the graphical rendering which captures the intended control flow of the process model. It then makes the continuation semantics explicit in a continuation model, which is transformed in a transformation engine until it reaches a normalized structure. This normalized structure is then transformed to executable workflow code, for example in the BPEL4WS (Business Process Execution Language for Web Services, or its graphical rendering as a UML activity diagram. The transformations guarantee the functional equivalence of the original business process model and the resulting workflow: when provided with the same input data, both will provide the same output data. Furthermore, the resulting BPEL4WS contains properly nested, hierarchical flows, which allow a simulation tool to perform simulation and analysis of the BPEL4WS at various levels of granularity.

1. Graphical Representation of the Business Process Model

Figure 1:
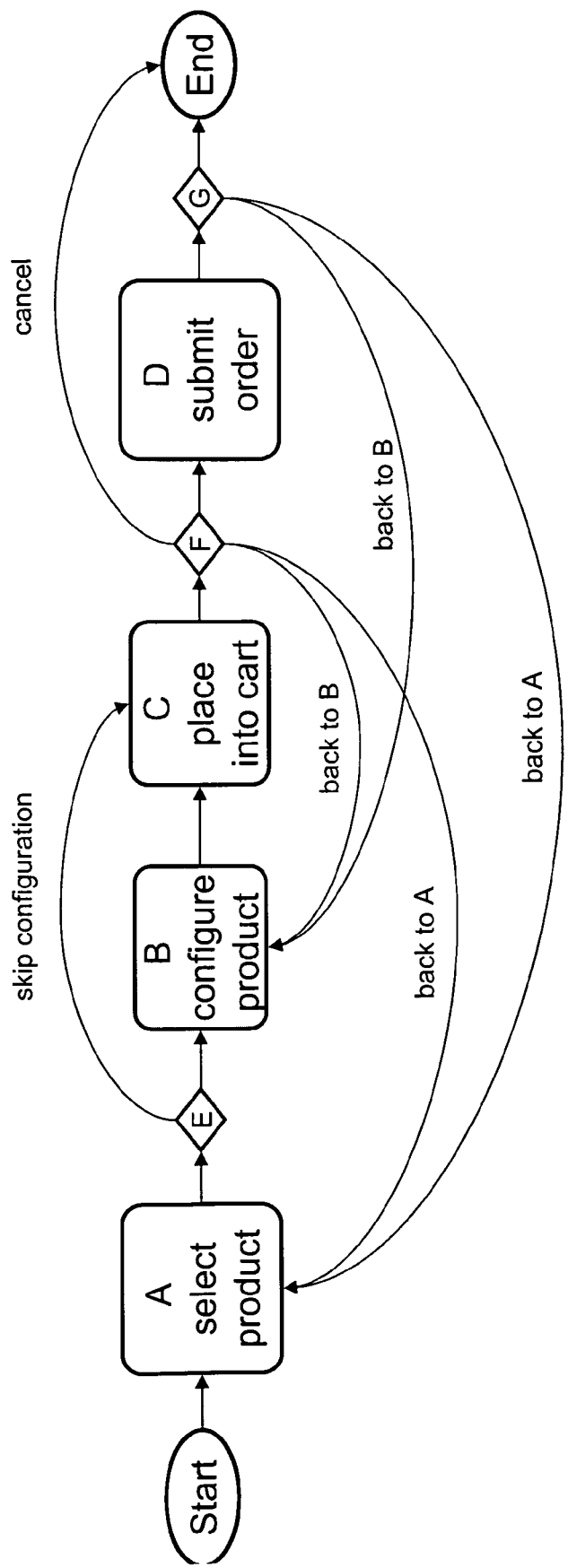
FIG. 1 an example of a graphical representation of a business process model, FIG. 2 the graphical representation of the business process model of FIG. 1 associated with continuation variables, FIG. 3 a graphical representation of a while-do loop, FIG. 4 a graphical representation of a repeat-until loop, FIG. 5 a graphical representation of a while-do loop being equal to the repeat-until loop of FIG. 4, FIG. 6 a graphical representation of the business process model of FIG. 1 in unified modeling language, FIG. 7 a block diagram with a transformation engine which applies a set of rules to a set of models, and FIG. 8 a block diagram of a system for generating executable workflow code from an unstructured cyclic process model.

FIG. 1 shows an example of a graphical representation of a business process model, wherein the business process model describes the possible flow of activities. This graphical representation uses well-defined elements from a graphical modeling language that was designed for business process modeling needs. Several different graphical modeling languages exist today to describe the process model. Well-known examples for these modeling languages are ARIS Easy Design (™ of IDS Scheer AG), WBI Modeler (™ of IBM), and BPMN. The invention can be used for any of these modeling languages and others not mentioned here, but known to the expert. Which one is used depends on the technical boundary conditions.

Strictly speaking, FIG. 1 shows an example of an electronic purchasing business process adopting a BPMN-like notation. The business process describes how a user buys products via an online purchasing system.

The example process consists of four activities A, B, C, and D and three decisions E, F, and G. Once the process has started, activity A "select product" is executed. After the "select product" activity has been completed, the process branches at decision E. The user can either decide to configure the product executing activity B "configure product" or he places the product directly into the shopping cart using activity C "place into cart". It should be noted that a non-concurrent process model is considered in which the branching is exhaustive and disjoint, i.e. after each decision exactly one of the possible branches is selected. After these activities have been completed, the user submits his order by executing activity D "submit order". This sequence of activities A, B, C and D describes the 'normal' purchasing process. For a successful implementation, however, this process should allow the user to freely navigate between the various activities. For example, after a product is placed into the cart, the user may want to revisit its configuration and perhaps change it. Furthermore, the user may want to select several products before he submits an order. After an order is submitted, the user may also want to revisit the configuration of the ordered product and/or change the set of selected products. Finally, a user may want to delay or cancel the placement of an order and leave the process without executing the activity D "submit order". This freedom in the process execution is described by the various back links from the decisions F and G to one of the possible activities A or B.

The example illustrates that arbitrary, unstructured cycles frequently occur in the graphical representation of business processes. Unstructured cycles are characterized by having more than one entry or exit point. The process shown in FIG. 1 contains such an unstructured cycle, which comprises the activities A, B, C, and D. This unstructured cycle can be entered at activity A by coming from either the start, the decision F, or the decision G. This unstructured cycle can also be entered at activity B by coming from the decisions F or G. It can be left via decision F, which allows the user to terminate a product selection and configuration process without placing an order, and decision G, which allows the user to terminate the purchasing process after his order is submitted. These multiple entry points (via A and B) and exit points (via F and G) are the characteristic features of unstructured cycles, which are sometimes also called wild or arbitrarily nested cycles. In contrast to unstructured cycles, a structured cycle has exactly one entry and one exit point, which is not shown in the example process of FIG. 1.

2. Mapping of the Graphical Model to a Set of Continuation Equations

In order to transform a business process model with unstructured cycles into a workflow code that supports structured cycles with uniquely defined entry and exit points, a continuation semantics is assigned to the graphical model. The continuation semantics partitions the graphical flow into the past, present, and future and allows it to describe the intended execution of a process model. For example, given the activity A, the activity A itself is considered as the present of the process, "Start" is considered as its past and the activities B or C are considered as its future. For a given node, which can be an activity or a decision, in the graphical flow (the present of the execution), its possible continuations (the remainder of the flow) can be described in the form of equations. This is done with the following method:

a) Assign a continuation variable to the start and end nodes.
b) Assign a continuation variable to each activity or decision node in the flow that has more than one incoming or outgoing link.

Figure 2:
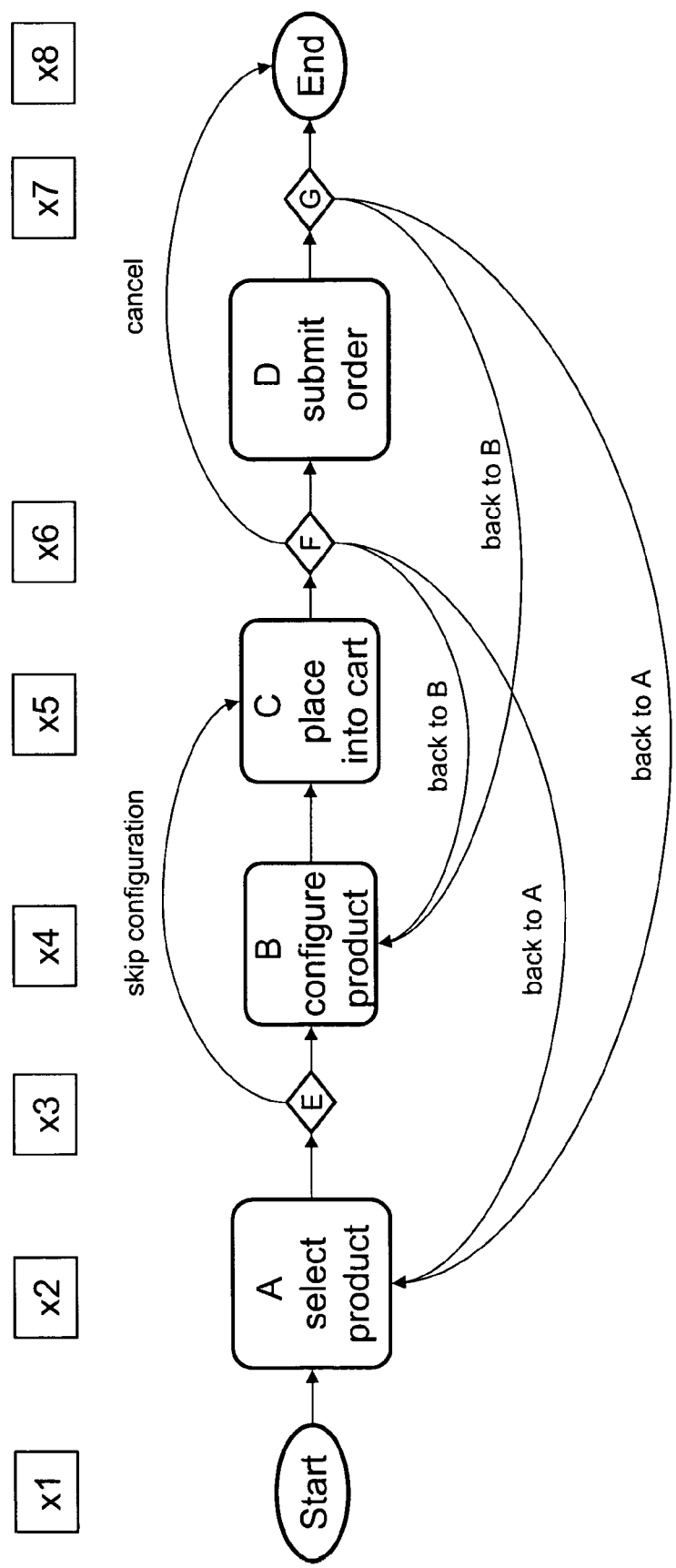
Figure 3:
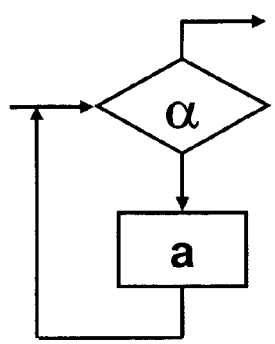

The assignment of the continuation variables according to the above mentioned rules 1 and 2 is depicted in FIG. 2.

Depending on which modeling language for the description of the graphical process model is used the mapping of the graphical representation of the business process model to the set of continuation equations can be adapted to meet the graphical process model, also called input model, described under section 1 "Graphical representation of the business process model".

In the following, it is described what happens during the execution of the process flow using the continuation variables $x1$ to $x8$. The equations are build as follows. On the left-hand side of the equation symbol, the continuation variable to be considered is put. On the right-hand side of the equation, the possible continuations that can follow this variable are described. A continuation can either be another variable or variables or it can be an activity, which we denote with "invoke A", "invoke B", etc. A linear continuation can be described using the sequence operator ";". A branching of the continuation is described using the conditional statement "if <condition> then x". Each link leaving a decision node in the process model is mapped to a branching. If a variable in the continuation at the left-hand side of the equation is encountered, a new equation is built. The <condition> in the conditional statement can be derived from the process model if its graphical representation is annotated with branching conditions for the decision nodes. If not, as it is the case in the example of FIG. 2, abstract names can be used to represent these conditions. For example, the condition that drives the continuation from process activity A to process activity B is denoted with AB, the condition to continue from activity A to activity C, is denoted with AC.

In the following, the continuation equations (1) to (8) derived from the process shown in FIGS. 1 and 2 are listed.

| | | |
|---|---|---|
| (1) | x1 = | Start; x2; |
| (2) | x2 = | invoke A; x3; |
| (3) | x3 = | if AB then x4; |
| | | if AC then x5; |
| (4) | x4 = | invoke B; x5 |
| (5) | x5 = | invoke C; x6 |
| (6) | x6 = | if CD then invoke D; x7 endif; |
| | | if CEnd then x8; |
| | | if CA then x2; |
| | | if CB then x4; |
| (7) | x7 = | if DB then x4; |
| | | if DA then x2; |
| | | if DEnd then x8; |
| (8) | x8 = | End; |

For the example model of FIGS. 1 and 2, it is started with a system of 8 continuation equations (1) to (8). The decisions E, F, and G are covered by the equations for the variables $x3$, $x6$, and $x7$. It can be seen that the number of outgoing links from a decision node corresponds to the number of conditional statements. The ordering of the conditional statements in the equations is arbitrary, because a non-concurrent business process model is considered.

3. Solving the System of Continuation Equations

Now the set of continuation equations (1) to (8) can be solved using the following four transformation rules 3.1 to 3.4:

3.1 Substitution:

The substitution rule reduces the number of continuation variables and thereby also the number of equations in the set of continuation equations. Given the occurrence of a continuation variable on the right-hand side of a continuation equation, this rule takes this variable and replaces it with the right-hand side of the equation having this variable on its left-hand side.

For example:
 x0=invoke K; x1
 x1=invoke L;

is substituted by:
    x0=invoke K;
        invoke L;

3.2 Factorization:

The factorization rule eliminates multiple occurrences of the same continuation variable within an equation by introducing a new Boolean variable. This Boolean variable is introduced in the beginning of the right-hand side of the equation and set to false. Each occurrence of the continuation variable is replaced with an assignment that sets the new Boolean variable to true. At the end of the right-hand side, a new conditional statement that tests the Boolean variable for being true and then branches to the continuation variable is added.

For example:
    x0=invoke K;
        if c then x1;
        invoke L;
        if d then x1;
is replaced by:
    x0=selx1 :=false;
        invoke K;
        if c then selx1 :=true;
        invoke L;
        if d then selx1 :=true;
        if selx1 then x1;

3.3 Derecursivation:

The derecursivation rule eliminates cycles. It is applied to rules that mention the same continuation variable at the left-hand and the right-hand side of an equation. The occurrence at the right-hand side of the equation is eliminated by a repeat-until statement ranging from the beginning of the right-hand side until the occurrence of the continuation variable. The condition that terminates the repeat-until statement is obtained from the negation of the conditions on the execution path that lead to the continuation variable. This rule can be applied if no other continuation variables occur between the equation sign and the recursive continuation variable. Otherwise, the continuations have to be reordered first using the if-distribution rule explained next.

Figure 7:
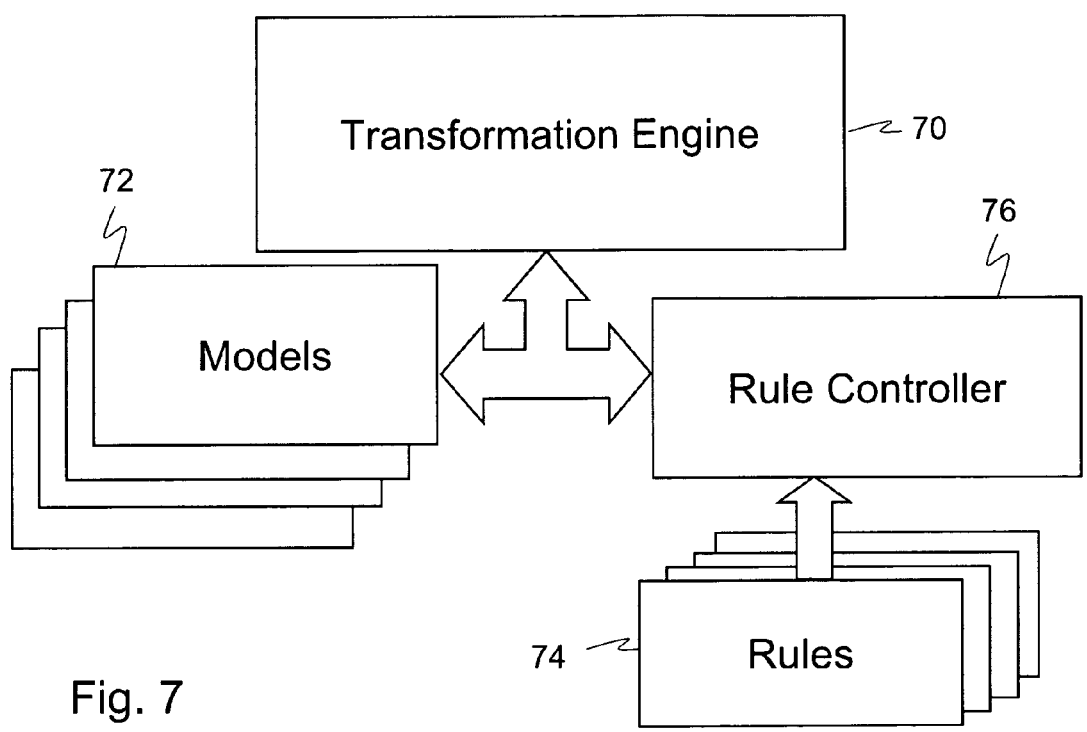

For example:
    x1=invoke K;
        if c then x1;
is replaced by:
    x1=repeat
        invoke K;
        until not c;

3.4 If-Distribution:

The if-distribution rule rearranges elements of the sequential continuations, which can be guarded by conditions. The rule may occur in different forms, which are shown below:
For example:

x0 = if c1 then x1;
        else if c2 then x2;
        endif;

is rearranged by:
    x1=if c1 then x1;
        if not c1 & c2 then x2;
And for example:
    x0=if c1 then x1;
        if c2 then x2;
is rearranged by:
    x0=if c2 then x2;
        if c1 then x1;

The above mentioned rules 3.1 to 3.4 are maintained and organized by a transformation engine which is shown in FIG. 7 and which operates in the following steps a) to c):

a) Select a rule that is applicable to an equation;
b) Apply the rule and compute the modified set of equations;
c) Go to step a) until only a single equation remains in the set of equations.

In the following, it is described how the set of example equations (1) to (8) is solved. For each cycle, the set of applicable rules is described, one or more of them is selected for application and the resulting transformed equation set is shown. The order in which rules are selected for application determines the quality of the generated workflow code. This means, by applying the rules in a particular order the code can be optimized in terms of the amount of memory that is required to store it and in terms of runtime and communication effort required to execute it. This optimization is discussed in section 4 "Optimizing the generated workflow instructions".

Pass 1:

In a first pass of the transformation engine, only the substitution rule is applicable, but it can be applied to many equations. The derecursivation rule is not applicable, because no equation contains the same variable on both sides. The factorization rule is not applicable, because no equation contains several occurrences of the same continuation variable on the right-hand side. The transformation engine decides to apply the substitution rule to the continuation variable $x3$ in continuation equation (2), to continuation variable $x6$ in continuation equation (5), and then to continuation variable $x7$ in the transformed continuation equation (5). The transformed continuation equation set (1) to (8) is shown below:

| (1) | x1 = | Start; x2; |
| (2) | x2 = | invoke A; |
|     |      | if AB then x4; |
|     |      | if AC then x5; |
| (4) | x4 = | invoke B; x5; |
| (5) | x5 = | invoke C; |
|     |      | if CD then invoke D; |
|     |      |     if DB then x4; |
|     |      |     if DA then x2; |
|     |      |     if DEnd then x8; |
|     |      | endif; |
|     |      | if CEnd then x8; |
|     |      | if CA then x2; |
|     |      | if CB then x4; |
| (8) | x8 = | End; |

Pass 2:

In the second pass, the transformation engine decides to work on the complex continuation equation (5) by applying the factorization rule to the continuation variables $x2$, $x4$, and $x8$, which each occur twice on the right-hand side of this equation. For each continuation variable, a new selector variable is introduced. As a next step, the variable $x8$ is eliminated by substituting the continuation equation (8). The transformed continuation equation (5) is shown below:

| (1) | x1 = | Start; x2; |
| (2) | x2 = | invoke A; |
|     |      | if AB then x4; |
|     |      | if AC then x5; |
| (4) | x4 = | invoke B; x5; |
| (5) | x5 = | selx2 := false; |

```
            selx4 := false;
            selx8 := false;
            invoke C;
            if CD then invoke D;
                if DB then selx4 := true;
                if DA then selx2 := true;
                if DEnd then selx8 := true;
            endif;
            if CEnd then selx8 := true;
            if CA then selx2 := true;
            if CB then selx4 := true;
            if selx2 then x2;
            if selx4 then x4;
            if selx8 then End;
```

Pass 3:

In pass 3 of the transformation engine, the continuation variable x4 is substituted in the continuation equations (2) and (5). Then, the multiple occurrences of the variable x5 in equation (2) are eliminated by applying the factorization rule again.

```
(1)  x1 =  Start; x2;
(2)  x2 =  selx5 := false;
            invoke A;
            if AB then invoke B;
                selx5 := true
            endif;
            if AC then selx5 := true;
            if selx5 then x5;
(5)  x5 =  selx2 := false;
            selx4 := false;
            selx8 := false;
            invoke C;
            if CD then invoke D;
                if DB then selx4 := true;
                if DA then selx2 := true;
                if DEnd then selx8 := true;
            endif;
            if CEnd then selx8 := true;
            if CA then selx2 := true;
            if CB then selx4 := true;
            if selx2 then x2;
            if selx4 then invoke B;
                x5
            endif;
            if selx8 then End;
```

Pass 4:

In the fourth pass, the transformation engine works on continuation equation (5) again. Equation (5) is recursive, because it contains the continuation variable x5 on both sides of the equation. The transformation engine can therefore apply the derecursivation rule. This rule introduces a repeat-until statement from the beginning of the right-hand side of the equation to the position where the variable x5 occurs (shown underline). It can be observed that the continuation variable x2 (shown in bold) occurs inside the continuation that the repeat-until loop will spawn. This means, before the derecursivation rule can be applied, the continuation leading to variable x2 has to be first moved outside the scope of the repeat-until loop.

```
(1)  x1 =  Start; x2;
(2)  x2 =  selx5 := false;
            invoke A;
            if AB then invoke B;
                selx5 := true
```

```
            endif;
            if AC then selx5 := true;
            if selx5 then x5;
(5)  x5 =  repeat
                selx2 := false;
                selx4 := false;
                selx8 := false;
                invoke C;
                if CD then invoke D;
                    if DB then selx4 := true;
                    if DA then selx2 := true;
                    if DEnd then selx8 := true;
                endif;
                if CEnd then selx8 := true;
                if CA then selx2 := true;
                if CB then selx4 := true;
                if selx4 then invoke B;
            until not selx4;
            if selx2 then x2;
            if selx8 then End;
```

Pass 5:

In pass 5, the continuation variable x5 is substituted in continuation equation (2). Then, the if-distribution rule is applied to move "if selx8 then End;" to the end of the equation again.

```
(1)  x1 =  Start; x2;
(2)  x2 =  selx5 := false;
            invoke A;
            if AB then invoke B;
                selx5 := true
            endif;
            if AC then selx5 := true;
            if selx5 then repeat
                selx2 := false;
                selx4 := false;
                selx8 := false;
                invoke C;
                if CD then invoke D;
                    if DB then selx4 := true;
                    if DA then selx2 := true;
                    if DEnd then selx8 := true;
                endif;
                if CEnd then selx8 := true;
                if CA then selx2 := true;
                if CB then selx4 := true;
                if selx4 then invoke B;
            until not selx4;
                if selx2 then x2;
            endif;
            if selx5 & selx8 then End;
```

Pass 6:

In pass 6 the transformed continuation equation (2) is recursive and thus, the derecursivation rule is applied by the transformation engine. It can be observed that the continuation variable x2 occurs inside a conditional statement (shown underlined), which would be incorrectly interrupted if the repeat-until statement would be simply introduced in the place where variable x2 occurs. The transformation engine therefore first moves the variable x2 after the end of the conditional statement. This can be done by collecting the conditions on the execution path towards variable x2 (shown in bold) and then moving variable x2 to the end of the right-hand side of the equation as shown below.

```
(2)  x2 =  selx5 := false;
            invoke A;
```

```
            if AB then invoke B;
                selx5 := true
            endif;
            if AC then selx5 := true;
            if selx5 then repeat
                selx2 := false;
                selx4 := false;
                selx8 := false;
                invoke C;
                if CD then invoke D;
                    if DB then selx4:=true;
                    if DA then selx2 := true;
                    if DEnd then selx8 := true;
                endif;
                    if CEnd then selx8 := true;
                    if CA then selx2 := true;
                    if CB then selx4 := true;
                    if selx4 then invoke B;
                    until not selx4;
                endif;
            if selx5 & selx2 then x2;
            if selx5 & selx8 then End;
```

Pass 7:

Now, in pass 7 the repeat-until loop can be introduced to replace the continuation variable x2 and the transformed continuation equation (2) can be inserted into continuation equation (1) to replace the final occurrence of variable x2. These last transformation steps solve the equation system. Only a single continuation equation defining the variable x1 is left, which contains no other continuation variables on its right-hand side. The Boolean variables, which have been introduced during the factorization steps are all maintained and manipulated by the generated code.

```
(1)  x1 =   Start;
            repeat
                selx5 := false;
                invoke A;
                if AB then invoke B;
                    selx5 := true;
                endif;
                if AC then selx5 := true;
                if selx5 then repeat
                    selx2 := false;
                    selx4 := false;
                    selx8 := false;
                    invoke C;
                    if CD then invoke D;
                        if DB then selx4 := true;
                        if DA then selx2 := true;
                        if DEnd then selx8 := true;
                    endif;
                        if CEnd then selx8 := true;
                        if CA then selx2 := true;
                        if CB then selx4 := true;
                        if selx4 then invoke B;
                    until not selx4;
                endif;
            until not (selx5 & selx2);
            if selx5 & selx8 then End;
```

The transformation engine guarantees that any transformation it applies preserves the continuation semantics of the process model. The flow described by the business process model in FIG. 1 and the flow described by the solved continuation equation (1) are functionally equivalent. This means, when invoked on the same input, both flows will produce exactly the same output.

4. Optimizing the Generated Workflow Instructions

Two main techniques for optimizing the generated workflow code exist:

4.1. The Solved Continuation Equation can be Further Simplified by Exploiting the Information in the Process Model.

4.2. The Transformation Engine can Modify the Generated Code by Applying the Transformation Rules in a Specific Order.

Both techniques are described in the following.

4.1. Simplifying the Solved Continuation Equation by Exploiting the Information in the Process Model The mechanically generated code looks not as if it can be easily understood. In fact, the workflow code can be further simplified by inspecting the various execution paths that it describes.

First, it can be observed that the last test "if selx5 & selx8 then End;" is unnecessary. Independently of whether the condition "selx5 & selx8" holds or not, the workflow will end, because it is the last instruction in the workflow code. Therefore, it can be removed and with that the continuation variable selx8 is no longer needed as well.

Secondly, it can be observed that activity C "place into cart" has to be executed in any execution. It will either directly follow activity A or it will follow activity B, but it cannot be skipped. How activity C is reached, is captured in the Boolean variable selx5, which is set to true after activity A or B have been executed. Recall that the flow model describes an exhaustive and disjoint branching after each decision node, i.e. any execution path in this process either starts with activities A; B; C or A; C. This means that the variable selx5 will be true in any execution and thus the test on variable selx5 being true as well as any occurrences of variable selx5 can be removed. This results in the following simplified continuation equation:

```
(1)  x1 =   Start;
            repeat
                invoke A;
                if AB then invoke B;
                repeat
                    selx2 := false;
                    selx4 := false;
                    selx8 := false;
                    invoke C;
                    if CD then invoke D;
                        if DB then selx4 := true;
                        if DA then selx2 := true;
                        if DEnd then selx8 := true;
                    endif;
                        if CEnd then selx8 := true;
                        if CA then selx2 := true;
                        if CB then selx4 := true;
                        if selx4 then invoke B;
                    until not selx4;
                until not selx2;
```

Next, the guard conditions for the remaining Boolean variables are made explicit. The guard conditions, that are encountered on executions paths that lead to a Boolean variable to be set to true, are collected.

selx2=(CD & DA) or CA
selx4=(CD & DB) or CB
selx8=(CD & DEnd) or CEnd

Obviously, variable selx2 captures the conditions under which activity A is revisited, variable Selx4 captures the conditions under which activity B is revisited, while variable selx8 captures the conditions under which the process is ending. Now, all statements from the continuation equation that set a Boolean variable to true or false can be eliminated and any test on the value of a Boolean variable can be replaced with the abstract transition conditions that was collected above.

Finally, the Start activity can be removed. In the example model of FIG. 1, it indicates only where the business process starts, but does not describe any business-relevant activity (data manipulation for example). The result of this simplification is:

```
(1) x1 =   repeat
              invoke A;
              if AB then invoke B;
              repeat
                 invoke C;
                 if CD then invoke D;
                 if (CD & DB) or CB then invoke B;
              until not ((CD & DB) or CB);
           until not ((CD & DA) or CA;
```

Now, continuation equation (1) contains two nicely nested loops. The inner loop captures the moving forward and backward between the activities B, C, and D. The outer loop captures the moving back to activity A from either activity C or D.

4.2. Controlling Rule Application Order

The second opportunity for optimizing the generated workflow code lies in computing the right order for the application of rules by the transformation engine. In order to control the rule application, the transformation engine keeps information about how often variables occur on the right-hand side of the equations and about which rules are applicable.

The transformation engine also defines a priority of application for the rules. Factorization has a higher priority than derecursivation, which in turn has a higher priority than substitution. If-distribution is only applied if required, which happens in two situations: First, to move any continuation of the flow towards the End activity to the very end of a continuation equation; secondly, to move continuation variables outside the scope of applicability of the derecursivation rule. How the rule application order is controlled is further explained with the help of the example of FIG. 1.

In the first pass, only the substitution rule was applicable. The following occurrences of continuation variables on the right-hand side of the continuation equations (1) to (8) are counted:

x2=3 x3=1 x4=3 x5=2 x6=1 x7=1 x8=2

It is noted that the continuation variables x3, x6, and x7 only occur a single time. Whenever such a single-occurrence variable exists, the transformation engine will apply the substitution rule to eliminate it from the continuation equation set. This happened in the first pass.

For the second pass, the factorization rule is applicable, because the continuation variables x2, x4, and x8 occur twice in the same right-hand side of a continuation equation. Because of its higher priority, this rule is applied. Then the substitution rule is considered again, which is controlled by the occurrence of the continuation variables, which has changed to:

x2=2 x4=2 x5=2 x8=1

Only the continuation variable x8 occurs a single time and thus the substitution rule is applied to eliminate it.

For the third pass, all remaining continuation variables occur exactly two times. None of the other rules is applicable, except the substitution rule. The transformation engine has no unique choice to continue. This phenomenon reflects the fact that the flow graph encoded in the business process model is non-reducible and some code duplication, i.e. substituting the same equation more than one time in different places, is mandatory. Flow graph reducibility is described in standard textbooks on compiler theory, e.g. Compilers: Principles, Techniques, and Tools by A. Aho, R. Sethi, and J. Ullman, Addison-Wesley Publishing Company, 1996. The transformation engine selects the variable that occurs the minimal number of times and if no such choice exists as it is the case in the example, it selects the variable that has the smallest right-hand side in its equation. "Small" can be defined in different ways depending on the goal of the code optimization. It can be the number of "invoke" statements, the number of conditions tested or any other user-defined criterion or combination thereof. In the example, it is tried to minimize the number of "invoke" statements followed by the number of tested conditions, because the number of web service invocations, which are generated for the workflow code, shall be minimized and the branching logic should be kept as simple as possible. Consequently, the transformation engine selects variable x4 in the third pass.

Eliminating variable x4 transforms equation (5) into a recursive equation and thus, in pass 5, the derecursivation rule is applied. It requires applying the if-distribution rule first, because another continuation variable occurs in the scope for applying this rule.

In pass 5, the only variables left are x2 (it occurs two times) and x5 (it occurs a single time). Consequently, variable x5 is substituted first. In pass 6, the derecursivation rule is applied because of its higher priority. It is preceded by the if-distribution rule, because another continuation variable occurs in the scope for applying this rule. Finally, in pass 7, a last application of the substitution rule is possible.

To see that a different order of applying the rules leads to a less compact workflow code, pass 1 is considered again. The resulting continuation equation set after pass 1 is repeated below:

```
(1) x1 =   Start; x2;
(2) x2 =   invoke A;
           if AB then x4;
           if AC then x5;
(4) x4 =   invoke B; x5;
(5) x5 =   invoke C;
           if CD then invoke D;
              if DB then x4;
              if DA then x2;
              if DEnd then x8;
           endif;
           if CEnd then x8;
```

-continued

```
              if CA then x2;
              if CB then x4;
 (8)  x8 =    End;
```

The occurrences of the continuation variables are as follows:

x2=3 x4=3 x5=2 x8=2

If the rule priorities are ignored and the substitution rule is simply applied, the variables x5 and x8 look as equally good choices. Applying both substitutions would yield the transformed equation set shown below. Apparently, the equations for the variables x2 and x4 have become much more complicated. In particular, it can seen that the transformation has unnecessarily duplicated the "invoke C" and "invoke D" statements (shown in bold). No transformation rule exists that will ever undo these code duplications.

```
 (1)  x1 =   Start; x2;
 (2)  x2 =   invoke A;
             if AB then x4;
             if AC then invoke C;
                if CD then invoke D;
                   if DB then x4;
                   if DA then x2;
                   if DEnd then End;
                endif;
                if CEnd then End;
                if CA then x2;
                if CB then x4;
             endif;
 (4)  x4 =   invoke B;
             invoke C;
             if CD then invoke D;
                if DB then x4;
                if DA then x2;
                if DEnd then End;
             endif;
             if CEnd then End;
             if CA then x2;
             if CB then x4;
```

The functional equivalence of the transformed model is still guaranteed, but unnecessary code duplication is a feature which should be avoided for any code generation method.

5. Mapping of the Solved System of Continuation Equations to BPEL4WS

The single equation that is computed by the transformation engine contains only two well-structured cycles in the form of repeat-until statements as well as a few conditional branches. It can be directly mapped to an XML file containing instructions for a workflow engine in the standardized language BPEL4WS (Business process execution language for Web Services).

The mapping is based on the following correspondences:

```
repeat-until not condition   <=>   <sequence>
                                       <assign newcondition = true />
                                       <while newcondition>
                                          <assign newcondition =
                                          condition/>
                                       </while>
                                   </sequence>
if guard then                <=>   <switch> <case condition = guard/>
                                   </switch>
invoke A                     <=>   <invoke A />
```

Figure 4:
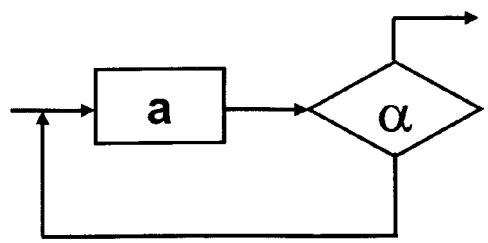
Figure 5:
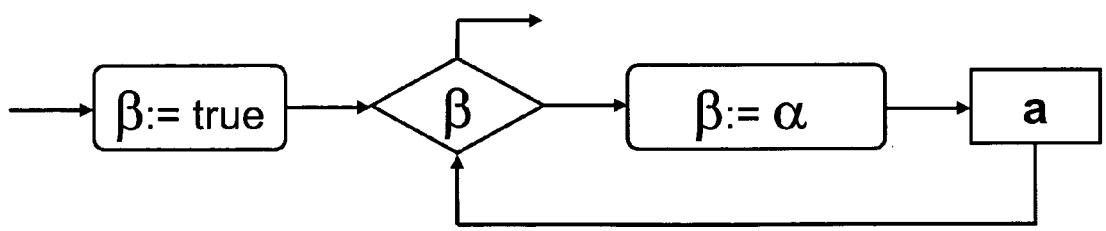

A repeat-until loop as shown in FIG. 4 can be mapped to an equivalent while-do loop depicted in FIG. 5.

The starting point for the mapping to BPEL4WS is the compact representation of the right-hand side of the remaining continuation equation that is mapped to the corresponding XML (Extensible Markup Language) elements. In the following, the abstract BPEL4WS specification that defines the control-flow for the workflow is shown, but many attribute values that specify the message exchange and linking to the web services, which implement the various activities are omitted. This information was not present in the example business process model, but could be easily added to the BPEL4WS file, if the business process model would be completed with that information, which can be captured in additional models.

```
<process>
    <sequence>
        <assign condition1 = true />
        <while condition1>
            <sequence>
                <assign condition1 = (( CD & DA ) or CA) />
                <invoke A/>
                <switch>
                    <case condition = AB>
                        <invoke B>
                    </case>
                </switch>
                <assign condition2 = true />
                <while condition2>
                    <sequence>
                        <assign condition2 = ((CD & DB) or CB) />
                        <invoke C/>
                        <switch>
                            <case condition = CD>
```

```
            <invoke D/>
          </case>
        </switch>
        <switch>
            <case condition= ( CD & DB ) or CB />
              <invoke B>
            </case>
        </switch>
      </sequence>
    <while/>
    </sequence>
  </while>
</sequence>
</process>
```

Figure 6:
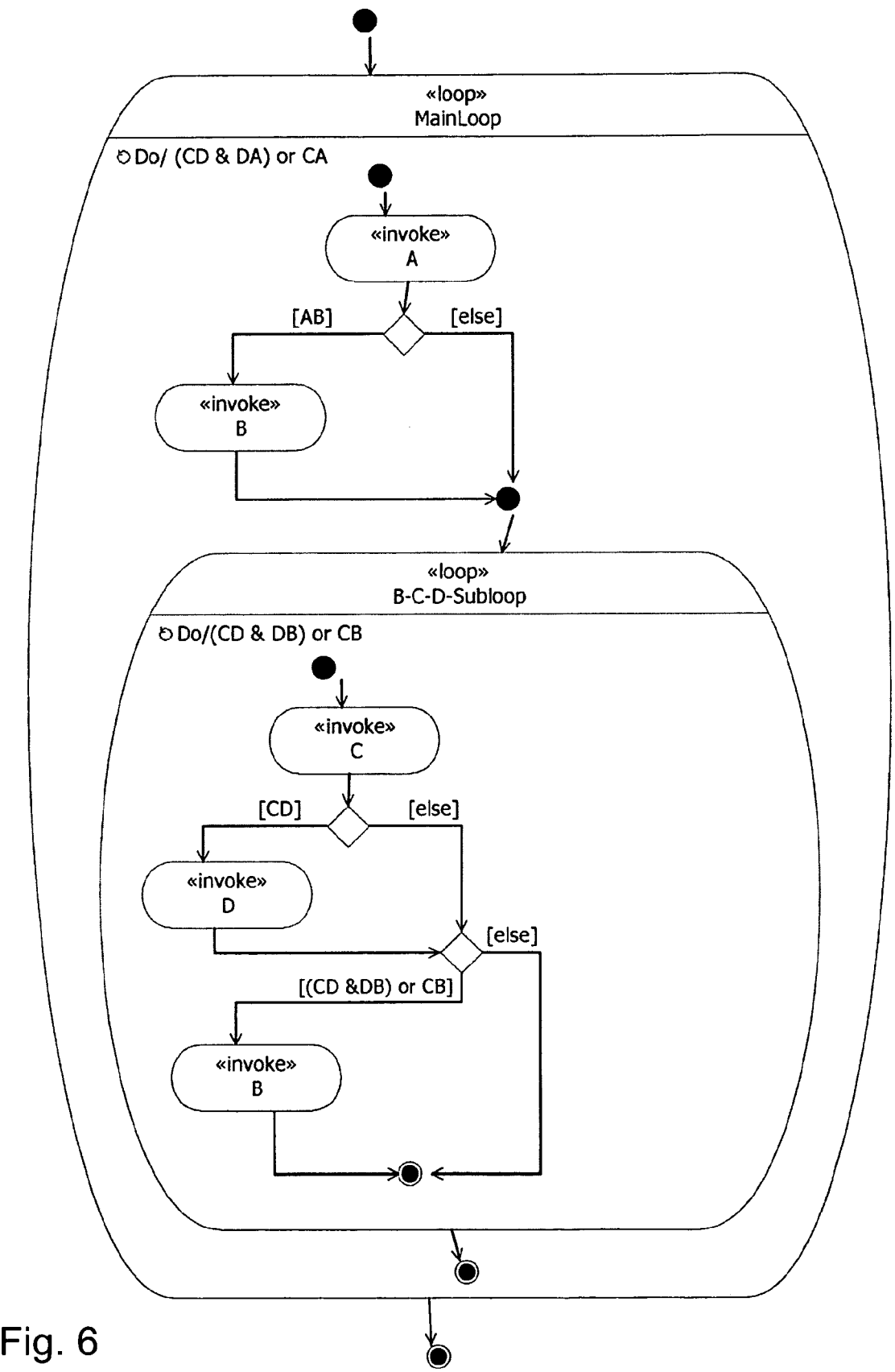

The XML representation can also be graphically displayed by mapping it for example to the UML (Unified Modeling Language) Profile for BPEL4WS by J. Amsden, T. Gardner, C. Griffin, S. Iyengar, J. Knapman: UML Profile for Automated Business Processes with a Mapping to BPEL 1.0, IBM Alphawork, http://dwdemos.alphaworks.ibm.com/wstk/common/wstkdoc/services/demos/uml2bpel/docs/UMLProfileForBusinessProcesses1.0.pdf, 2003, which is shown in FIG. 6.

6. Variants of the Transformation Method

A transformation engine 70 shown in FIG. 7 works on a set of models 72 to which it applies a set of rules 74, wherein the application of the rules 74 or transformation rules 74 is controlled by a rule controller 76. Many variations points exist for the above described transformation method.

The model representation can be varied. For example, the graphical business process model can be mapped to a set of mathematical equations. Alternatively, also BPEL4WS could be directly used to encode the continuation semantics of the business process model and then further the BPEL4WS model is transformed until its control flow is optimized.

The rules 74 can also be modified. Obvious modifications are to change the derecursivation rule such that it directly generates while-do loops instead of repeat-until loops. The factorization rule could be modified such that it does not introduce additional Boolean variables, but maintains the branching logic directly. Additional rules or different rule sets can also be imagined to achieve other transformations, which may be required by a particular target workflow engine.

The rule controller 76 implements the priorities among rules and guides the order in which rules can be applied. Different controllers could be used to achieve different optimization criteria during the transformation.

Figure 8:
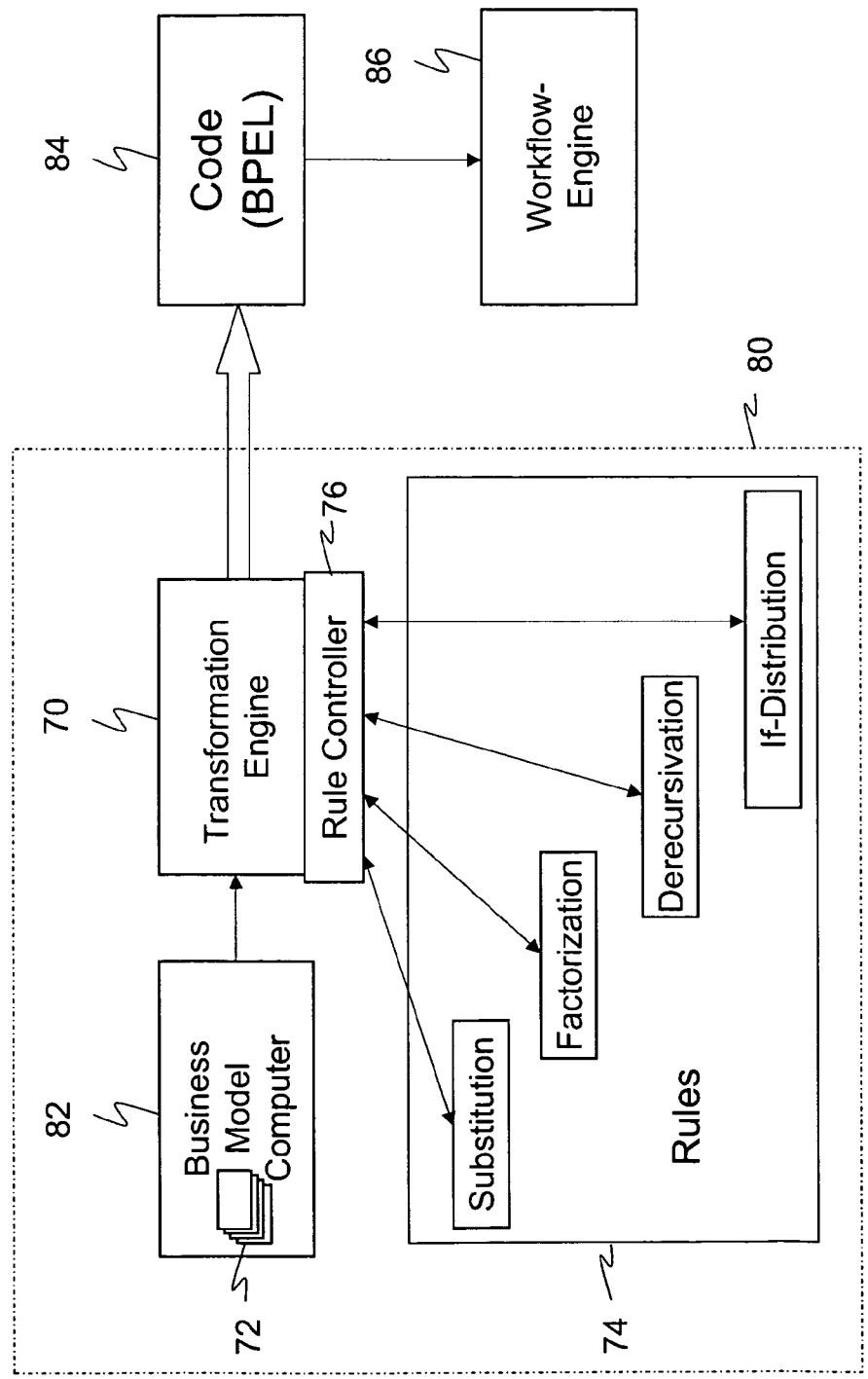

FIG. 8 shows a system for generating executable workflow code 84 from an unstructured cyclic process model 72. The code that comprises workflow engine instructions is executable by a workflow engine 86. The workflow engine 86 could be a server or multiple computers which might be distributed. FIG. 8 shows a computing device 82, that here is a business model computer 82, programmed for designing the unstructured cyclic process model 72. The business model computer 82 is connected to the transformation engine 70 with the rule controller 76. The rule controller has access to the rules 74. The transformation engine 70 generates a continuation equation system from the unstructured cyclic process model, applies the transformation rules 74, and outputs the executable workflow code 84. The executable workflow code 84, e.g. BPEL, can then directly be executed by the workflow engine 86. As indicated in the figure, the business model computer 82 and the transformation engine 70 can be a computing unity 80 that is also referred to as code generator.

The presented method and code generator can support a business consultant or analyst in automatically transforming an unstructured cyclic process model into a well-structured and executable workflow code.

The invention claimed:

1. A computer-implemented method for generating an executable workflow code from an unstructured cyclic process model, said method comprising:
generating, by a computing device, a continuation equation system from the unstructured cyclic process model; and
generating, by said computing device, the executable workflow from the continuation equation system;
assigning, by said computing device, variables to nodes of said unstructured cyclic process model;
substituting, by said computing device, one variable of a first equation by an expression of a second equation, said substituting based on a first transformation rule;
reducing, by said computing device, a number of occurrences of a same variable in said continuation equation system, said reducing based on a second transformation rule;
replacing, by said computing device, each variable with a Boolean variable; and
branching, by said computing device, to said Boolean variable if said Boolean variable fulfills a condition of a conditional statement introduced in said continuation equation system.

2. The method according to claim 1, wherein one of said variables is assigned to a start node and one of said variables is assigned to an end node of the process model, and
wherein one of said variables is assigned to one of said nodes that has more than one incoming or outgoing link.

3. The method according to claim 1, wherein for generating the executable workflow code the continuation equation system is solved by means of transformation rules.

4. The method according to claim 3, wherein one of said transformation rules is selected such that it is applicable to an equation of the continuation equation system,
wherein the selected transformation rule is applied to the equation and a modified continuation equation system is computed, and
wherein these steps are repeated until a single equation remains.

5. The method according to claim 3, wherein with the help of a third transformation rule one variable occurring on both sides of the equation is replaced by a repeat-until statement.

6. The method according to claim 5, wherein the condition for terminating the repeat-until statement is obtained from the negation of the condition that led in the original equation to the variable.

7. The method according to claim 3, wherein each transformation rule is assigned to a priority, and
wherein the transformation rule with the highest priority is applied first.

8. The method according to claim 1, wherein that variable is eliminated first which occurs most seldom in the continuation equation system.

9. The method according to claim 4, wherein the single equation is mapped to an XML file.

10. A non-transitory computer program element comprising computer program code which, when loaded in a processor of a computing device, configures the processor to perform a method comprising:
generating a continuation equation system from the unstructured cyclic process model;
generating the executable workflow from the continuation equation system;
assigning variables to nodes of said unstructured cyclic process model;
substituting one variable of a first equation by an expression of a second equation, said substituting based on a first transformation rule;
reducing a number of occurrences of a same variable in said continuation equation system, said reducing based on a second transformation rule;
replacing each variable with a Boolean variable; and
branching to said Boolean variable if said Boolean variable fulfills a condition of a conditional statement introduced in said continuation equation system.

11. A code generator for generating an executable workflow code from an unstructured cyclic process model, the code being executable by a workflow engine, said code generator comprising:
a computing device for designing the unstructured cyclic process model; and
a transformation engine adapted to generate:
a continuation equation system from the unstructured cyclic process model; and
the executable workflow code from the continuation equation system;
assigning variables to nodes of said unstructured cyclic process model;
substituting one variable of a first equation by an expression of a second equation, said substituting based on a first transformation rule;
reducing a number of occurrences of a same variable in said continuation equation system, said reducing based on a second transformation rule;
replacing each variable with a Boolean variable; and
branching to said Boolean variable if said Boolean variable fulfills a condition of a conditional statement introduced in said continuation equation system.

12. A machine-implemented method for generating an executable workflow code, said method comprising:
generating, using a computing device, a continuation equation system from a graphical description of an unstructured cyclic process model; and
generating, using said computing device, the executable workflow code from the continuation equation system,
wherein for generating the continuation equation system variables are assigned to nodes of the process model by said computing device,
wherein one of said variables is assigned to a start node and one of said variables is assigned to an end node of the process model by said computing device,
wherein one of said nodes has more than one incoming or outgoing link,
wherein for generating the executable workflow code the continuation equation system is solved by means of transformation rules by said computing device,
wherein one of said transformation rules is selected by said computing device such that it is applicable to an equation of the continuation equation system,
wherein the selected transformation rule is applied by said computing device to the continuation equation system and a modified continuation equation system is computed by said computing device, and
wherein said method of selecting and applying transformation rules is repeated by said computing device until a single equation remains,
wherein, with the help of a first transformation rule, one variable of a first equation is substituted by an expression of a second equation by said computing device,
wherein, with the help of a second transformation rule, the number of occurrences of the same variable in the continuation equation system is reduced by said computing device, wherein at each place where the variable occurs it is replaced by a Boolean variable by said computing device, wherein a conditional statement is introduced by said computing device in the continuation equation system for branching to the variable if the Boolean variable fulfills the condition,
wherein with the help of a third transformation rule, one variable occurring on both sides of the continuation equation system is replaced by a repeat-until statement by said computing device, wherein the condition for terminating the repeat-until statement is obtained by said computing device from the negation of the condition that led in the original equation to the variable,
wherein each of said transformation rules is assigned to a priority by said computing device, and the transformation rule with the highest assigned priority is applied first by said computing device,
wherein a variable is eliminated first which occurs most seldom in the continuation equation system by said computing device, and
wherein the single equation is mapped to an XML file by said computing device.

13. A machine-implemented method for generating an executable workflow code, said method comprising:
generating, using a computing device, a continuation equation system from a graphical description of an unstructured cyclic process model; and
generating, using said computing device, the executable workflow code from the continuation equation system,
wherein for generating the continuation equation system variables are assigned to nodes of the process model by said computing device,
wherein one of said variables is assigned to a start node and one of said variables is assigned to an end node of the process model by said computing device,
wherein one of said nodes has more than one incoming or outgoing link,
wherein for generating the executable workflow code the continuation equation system is solved by means of transformation rules by said computing device,
wherein one of said transformation rules is selected by said computing device such that it is applicable to an equation of the continuation equation system,
wherein the selected transformation rule is applied by said computing device to the continuation equation system and a modified continuation equation system is computed by said computing device, and wherein said method of selecting and applying transformation rules is repeated by said computing device until a single equation remains, wherein, with the help of a first transformation rule, one variable of a first equation is substituted by an expression of a second equation by said computing device, wherein, with the help of a second transformation rule, the number of occurrences of the same variable in the continuation equation system is reduced by said computing device, wherein at each place where the variable occurs it is replaced by a Boolean variable by said computing device, wherein a conditional statement is introduced by said computing device in the continuation equation system for branching to the variable if the Boolean variable fulfills the condition, wherein with the help of a third transformation rule, one variable occurring on both side of the continuation equation system is replaced by a repeat-until statement by said computing device, wherein the condition for terminating the repeat-until statement is obtained by said computing device from the negation of the condition that led in the original equation to the variable, wherein a fourth transformation rule rearranges elements of the continuation equation system by said computing device;

wherein each of said transformation rules is assigned to a priority by said computing device, and the transformation rule with the highest assigned priority is applied first by said computing device, wherein a variable is eliminated first which occurs most seldom in the continuation equation system by said computing device, and wherein the single equation is mapped to an XML file by said computing device.

14. A machine-implemented method for generating an executable workflow code, said method comprising:

generating, using a computing device, a continuation equation system from a graphical description of an unstructured cyclic process model; and generating, using said computing device, the executable workflow code from the continuation equation system;

generating, using a computing device, a continuation equation system from the unstructured cyclic process model; and generating, using said computing, the executable workflow from the continuation equation system, wherein for generating the continuation equation system variables are assigned to nodes of the process model by said computing device, wherein one of said variables is assigned to a start node and one of said variables is assigned to an end node of the process model by said computing device, wherein one of said nodes has more than one incoming or outgoing link, wherein for generating the executable workflow code the continuation equation system is solved by means of transformation rules by said computing device, wherein one of said transformation rules is selected by said computing device such that it is applicable to an equation of the continuation equation system, wherein the selected transformation rule is applied by said computing device to the continuation equation system and a modified continuation equation system is computed by said computing device, and wherein said method of selecting and applying transformation rules is repeated by said computing device until a single equation remains, wherein, with the help of a first transformation rule, one variable of a first equation is substituted by an expression of a second equation by said computing device, wherein, with the help of a second transformation rule, the number of occurrences of the same variable in the continuation equation system is reduced by said computing device, wherein at each place where the variable occurs it is replaced by a Boolean variable by said computing device, wherein a conditional statement is introduced by said computing device in the continuation equation system for branching to the variable if the Boolean variable fulfills the condition, wherein with the help of a third transformation rule, one variable occurring on both sides of the continuation equation system is replaced by a repeat-until statement by said computing device, wherein the condition for terminating the repeat-until statement is obtained by said computing device from the negation of the condition that led in the original equation to the variable, wherein each of said transformation rules is assigned to a priority by said computing device, and the transformation rule with the highest assigned priority is applied first by said computing device, wherein a variable is eliminated first which occurs most seldom in the continuation equation system by said computing device, and wherein the single equation is mapped to an XML file by said computing device.

* * * * *